United States Patent [19]

Cullen

[11] Patent Number: 4,676,104
[45] Date of Patent: Jun. 30, 1987

[54] SURFACE SKIMMING BULK ACOUSTIC WAVE ACCELEROMETER

[75] Inventor: Donald E. Cullen, Manchester, Conn.

[73] Assignee: United Technologies Corporation, Hartford, Conn.

[21] Appl. No.: 762,900

[22] Filed: Aug. 6, 1985

[51] Int. Cl.⁴ ............................................. G01P 15/08
[52] U.S. Cl. ................................. 73/516 R; 73/517 R; 310/313 R
[58] Field of Search ......... 73/517 R, 516 R, 517 AV; 310/313 R, 329

[56] References Cited

U.S. PATENT DOCUMENTS

| | | | |
|---|---|---|---|
| 3,848,144 | 11/1974 | Schissler | 310/329 |
| 4,306,456 | 12/1981 | Maerfeld | 73/517 R |
| 4,333,342 | 6/1982 | Gilder et al. | 73/516 R |
| 4,515,016 | 5/1985 | Hartemann et al. | 73/517 R |

FOREIGN PATENT DOCUMENTS 2123554  2/1984  United Kingdom ............. 73/517 R

OTHER PUBLICATIONS

Lewis et al., Surface Skimming Bulk Waves, SSBW, 1977 Ultrasonics Symposium Proceedings, IEEE Cat. #77CH1264.

Primary Examiner—Stewart J. Levy
Assistant Examiner—Scott M. Oldham
Attorney, Agent, or Firm—J. Kevin Grogan; Dominic J. Chiantera

[57] ABSTRACT

An accelerometer includes a cantilevered pieozelectric beam mounted to a surface inside a fluid filled chassis with a proof mass attached to the beam's free end. Surface skimming bulk wave delay lines are mounted on opposing major surfaces of the beam and are responsive to strain induced therein by acceleration of the proof mass.

7 Claims, 8 Drawing Figures

SURFACE SKIMMING BULK ACOUSTIC WAVE ACCELEROMETER

The Government has rights in this invention pursuant to Contract No. F49620-84-C-0006 awarded by the Department of the Air Force.

DESCRIPTION

1. Technical Field

This invention relates to accelerometers and more particularly to accelerometers employing surface skimming bulk acoustic waves.

2. Background Art

For many years guidance systems in both aircraft and spacecraft as well as guided weaponry have employed various devices to measure acceleration. Some applications require that the value of acceleration be determined to one thousandths of a "g" where one "g" is equal to the acceleration of the earth's gravity at its surface.

The prior art includes accelerometers that comprise a mass supported on a cantilevered beam. Acceleration of the mass about a fixed axis will stress the beam and produce a strain therein detected by a strain gauge on the beam.

Bonded resistor type strain gauges relate an internal change in electrical resistance to the acceleration. However, the sensitivity of accelerometers using bonded resistors is limited to approximately two percent full range of the movement.

The prior art also contains a more sensitive strain sensor that employs surface acoustic waves (SAW) propagating along a surface of a piezoelectric cantilevered beam. As the beam is strained under acceleration, the velocity of the surface acoustic wave is altered. The magnitude of the acceleration can be determined in a variety of ways, such as by a change in frequency of a resonant circuit in which the frequency of oscillation is primarily dependent upon the acoustic velocity of the wave.

Accelerometers which use a cantilevered beam to measure acceleration are burdened with another serious limitation. The design of the cantilevered beam must be such that a device remains flexible for sensitivity and yet have an acceptable vibration response characteristic near the mechanical resonance frequency. Accelerometers of the prior art have addressed this problem by using cantilevered beams which are flexible and have an external fluid in contact therewith which critically damps the cantilevered beam, thereby negating the effects of a possible resonance which would deteriorate the performance of the device.

It is well known in the art that the surface acoustic waves (SAW) in these accelerometers travel along the surface of the piezoelectric beam. Therefore, any foreign material in contact with the beam's surface will disturb the surface acoustic wave propagating thereon. Moreover, the presence of the damping fluid on the beam's surface renders the accelerometer inoperative as the surface acoustic wave is totally absorbed by the fluid.

Fluid damped surface acoustic wave accelerometers of the prior art which try to compensate for the presence of damping fluid, include U.S. Pat. No. 4,333,342 of Gilden et al in of June 8, 1982, which discloses an accelerometer having an external enclosure around a resonant SAW transducer structure fabricated on the surface of a cantilevered beam. This approach effectively isolates the surface acoustic wave structure from the damping fluid at the expense of increased cost and complexity. Moreover, efforts to encapsulate SAW devices within sealed packages lead to unstable package induced beam strains that are unpredictable and degrade sensor accuracy and sensitivity.

DISCLOSURE OF INVENTION

An object of the present invention is to provide a surface skimming bulk wave strain sensor employing surface skimming bulk waves propagating in a piezoelectric beam. Another object of the present invention is to provide a surface skimming bulk wave accelerometer using surface skimming bulk waves propagating in a cantilevered piezoelectric beam.

According to the present invention, a surface skimming bulk wave strain sensor comprises a chassis having a first surface and a piezoelectric beam. The beam has opposing first and second major surfaces as well as opposing first and second minor surfaces that are aporoximately perpendicular to the major surfaces, with the piezoelectric beam's first minor surface affixed to the chassis first surface and with the piezoelectric second minor surface adapted to receive a load, inducing a strain in the piezoelectric beam in response thereto. Also included is an RF excitation circuit which has a first RF oscillator circuit that includes a delay line connected in series therewith formed on the piezoelectric beam's first major surface generating surface skimming bulk waves therein. In addition, the RF excitation circuit provides a strain siqnal whose frequency is indicative of the magnitude of the strain in the oiezoelectric beam.

According to another aspect of the invention, a surface skimming bulk wave accelerometer comprises a chassis having an interior cavity with a first sidewall therein. The cavity contains a damping fluid. Also included is a cantilevered piezoelectric beam which has opposed first and second major surfaces and opposed first and second minor surfaces that are approximately perpendicular to the major surfaces. The cantilevered piezoelectric beam first minor surface is affixed to the chassis cavity first surface. The second minor surface of the cantilevered piezoelectric beam has a proof mass attached thereto. A strain is induced in the cantilevered piezoelectric beam in response to an acceleration of the proof mass. In addition, the surface skimming bulk wave accelerometer includes an RF excitation circuit that has a first RF oscillator circuit. A delay line is connected in series with the oscillator circuit and is formed on the cantilevered piezoelectric beam first major surface, generating surface skimming bulk waves in the cantilevered piezoelectric beam. The RF excitation circuit provides a strain signal whose frequency is proportional to the magnitude strain in the piezoelectric beam and the acceleration thereof.

BEST MODE FOR CARRYING OUT THE INVENTION

Figure 1:
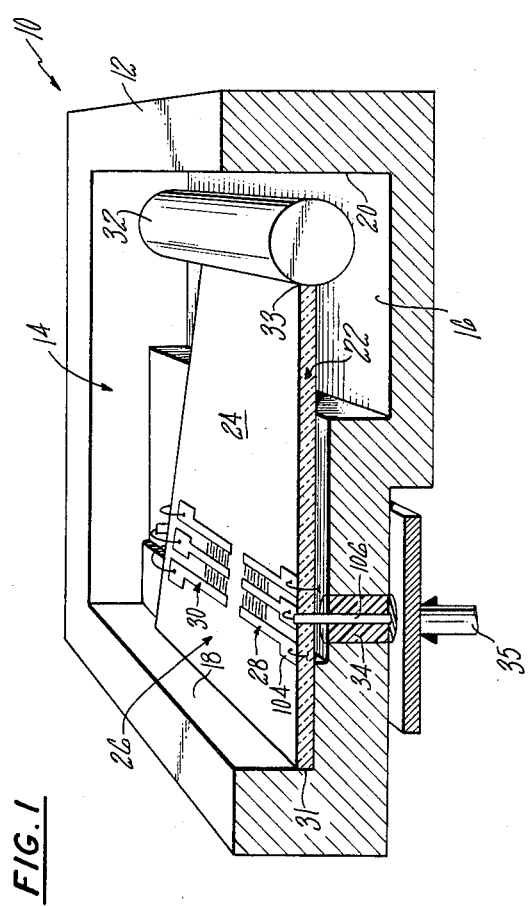
FIG. 1 is an illustration partially in perspective and partially in section of a surface skimming bulk wave (SSBW) accelerometer provided according to the present invention.

Referring now to FIG. 1, in an illustration partially in section and partially in perspective of a surface skimming bulk wave accelerometer 10 according to the present invention, the accelerometer includes chassis 12 comprising brass, copper or aluminum which has a cavity 14 formed therein. In the best mode embodiment the cavity has a bottom surface 16 comprised of three different sections resulting in first sidewall 18 having a much shallower depth than the second sidewall 20. The number of levels and dimensions thereof are not critical and are selected to promote ease of fabrication and assembly of the accelerometer.

A cantilevered piezoelectric beam 22 has a first major surface 24 and a second major surface opposite thereto (not shown). In the best mode embodiment a surface skimming bulk wave delay line 26 is formed on each major surface. However, those skilled in the art will recognize that the accelerometer may comprise only a single delay line formed on one major surface. The delay line comprises two interdigital transducers 28, 30 of a type known in the art. However, in the best mode embodiment, the transducers comprise a coplanar feed transducer as described hereinafter with respect to FIG. 5.

The cantilevered piezoelectric beam also has opposed first and second minor surfaces (not shown) that are approximately perpendicular to the major surfaces. The beam is positioned within the cavity by affixing the beam's first minor surface 31 to first sidewall 18 by epoxy or other equivalent means. Similarly, a proof mass 32 is attached by conventional techniques to the other minor surface 33 of the cantilevered beam. As hereinafter detailed with respect to FIG. 2, the cantilevered beam comprises quartz or other piezoelectric material such as lithium niobate with a crystallographic orientation which supports surface skimming bulk waves.

The accelerometer also includes radio frequency feedthrough connectors 34, for conducting radio frequency (RF) signals presented from external circuitry, on lines 35, to one of the interdigital transducers of each delay line. In response, the transducers generate surface skimming bulk waves within the beam which propagate to the opposite transducer of the delay line and provide a feedback signal to the external electrical circuitry.

In the best mode embodiment the cavity is filled with a damping fluid (not shown) of a type known in the art, such as silicone oil. A conventional gasket is fitted to the cavity and a cover is securely attached by conventional means to seal the accelerometer cavity. Neither the cover nor gasket are illustrated in FIG. 1.

Figure 2:
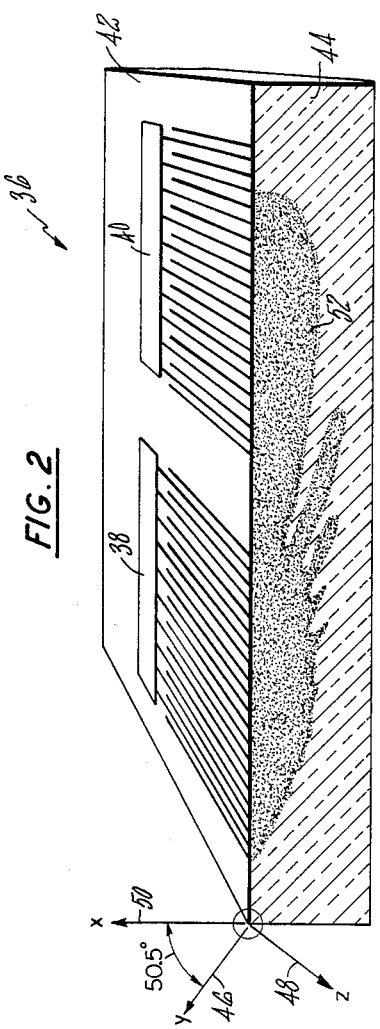
FIG. 2 contains an illustration partially in section and partially in perspective of a surface skimming bulk wave delay line formed on a piezoelectric beam and the propagation pattern of a surface skimming bulk wave (SSBW) excited therein.

FIG. 2 is an illustration partially in section and partially in perspective of a surface skimming bulk wave delay line 36 provided according to the present invention. The delay line includes launching interdigital transducer 38 and receiving interdigital transducer 40 formed of aluminum or equivalent materials by conventional photolithographic and metallization techniques on surface 42 of a piezoelectric substrate 44.

The existence and propagation parameters of surface skimming bulk waves or (SSBW) in piezoelectric materials are now well known. Surface skimming bulk waves comprise a class of the generic subsurface acoustic wave, which also includes the generalized Stoneley wave. Both classes of waves propagate on or within close proximity, i.e. a few wavelengths of the surface of a piezoelectric substrate. Moreover, they can be easily excited by conventional interdigitated transducers commonly used to excite and detect surface acoustic waves in piezoelectric substrates. These waves are sensitive to external perturbations of the piezoelectric medium through which they are propagating and provide a good measure of the internal strain therein with minimum sensitivity to surface conditions, like contamination or contact with foreign material.

A generalized Stoneley wave can be excited by these techniques in a layered media structure comprising a thin dielectric nonpiezoelectric film, such as silicon dioxide, vacuum deposited onto a piezoelectric substrate such as a 128° rotated Y-cut lithium niobate crystal. Those skilled in the art will note that the performance reproducibility of a layered media structure is strongly dependent on the thin film deposition parameters which can cause stresses in the film. Reproducibility of performance can be improved by a thorough parametric investigation of deposition techniques and the annealing processes involved.

Surface skimming bulk waves can be excited in a single crystal quartz substrate for both the AT cut ($-36°$ rotated Y-cut) and the BT cut ($+50.5°$ rotated Y-cut). Substrate 44 in FIG. 2 comprises a 50.5° rotated Y-cut quartz substrate. Axes 46, 48, and 50 correspond to the y, z, and x crystallograhic axes. Axis 50 corresponds to the cut of the crystal and illustrates the geometrical relationship between this cut and the crystallographic axes.

The transducers comprise a surface skimming bulk wave delay line and are connected in series with an external RF oscillator circuit (not shown). In steady state operation radio frequency signals provided to the launching interdigitated transducer by a connector means (not shown) radiate acoustic energy into the substrate near its surface as illustrated by radiation pattern 52. After a propagation delay, the receiving interdigitated transducer provides an electrical signal equivalent of the surface skimming bulk wave back to the RF oscillator circuit.

The operation of a surface skimming bulk wave delay line as illustrated in FIG. 2 is readily understood in terms of antenna theory with the interdigitated transducers acting as end fire array antennas. Only at the synchronous frequency determined by the shear wave velocity of the propagating surface skimming bulk waves and the periodicity of the transducers, or at odd harmonics of the synchronous frequency is energy radiated near the surface as shown. At other frequencies the energy is radiated into the bulk of the crystal.

Illustrated in FIG. 2 is the basic delay line configuration with the simplest two finger per wavelength interdigital transducer pattern for transducers 38 and 40. This transducer pattern with fingers and gaps at one-quarter wavelength is not often used in practice because of the large spurious signals generated by this type of design. More often a "double electrode" or "split finger" transducer with one-eighth wavelength fingers and gaps is employed so that reflected signals from adjacent electrodes are 180° out of phase with one another. Hence, the total reflected signal is minimized. In the best mode embodiment the surface skimming bulk wave resonator electrodes are fabricated in a "split finger" design detailed hereinafter with respect to FIG. 5.

In order to obtain low insertion losses with a surface skimming bulk wave delay line, it is necessary to (1) use long transducers to obtain sufficient coupling, and (2) keep the transducer to transducer spacing as short as possible to minimize propagation losses. The use of split finger type transducers minimizes the reflected signals that would otherwise be a problem with long transducers. This design does not solve the problem of radiated coupling between input and output transducers that exist with short transducer to transducer spacing. Radiated coupling can be minimized with a modified split finger transducer design such as the coplanar feed transducer detailed hereinafter with respect to FIG. 5.

Figure 3:
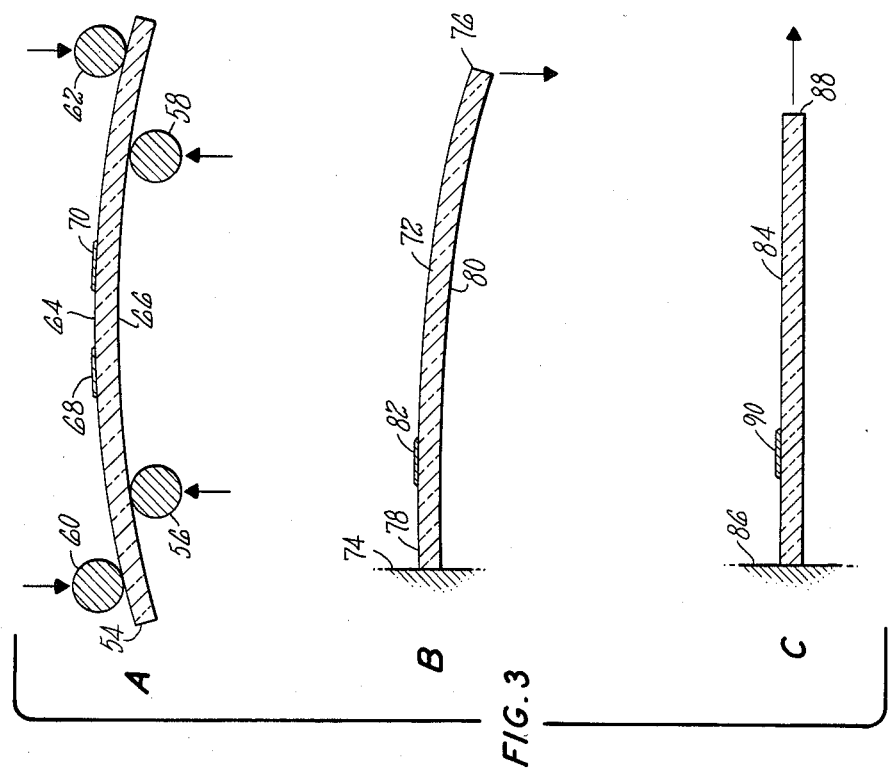
FIG. 3A-3C show three illustrations of sectioned piezoelectric substrates undergoing three types of strain.

FIG. 3 contains three illustrations of sectioned piezoelectric substrates having surface skimming bulk wave delay lines fabricated thereon configured to demonstrate three types of strain sensed by a strain sensor provided according to the present invention.

FIG. 3A contains a cylindrical stress configurations comprising a piezoelectric substrate 54 that is positioned between mounts 56 and 58 and mounts 60 and 62. Opposing external forces perpendicular to the longitudinal axis of the substrate are applied to the substrate by the mounts. As a result the substrate is deformed, producing a tensile strain in the central region of substrate top surface 64 and a compressive strain in the corresponding region of bottom surface 66. The tensile strain in the top surface will perturb the velocity of any surface skimming bulk waves propagating therein between transducers 68 and 70 that comprise a delay line on the top surface. If the substrate's width is two or more times the distance between the mounts, the perpendicular component of the bending stress is small enough to be neglected so that the strain in the central region of the top and bottom surfaces of the substrate has only one component.

FIG. 3B contains cantilevered stress configuration comprising a piezoelectric substrate 72 attached to mount 74, forming a cantilevered beam. An external force is applied to free end 76 of the substrate. This cantilevered configuration results in stress varying linearly along the length of the substrate so an average value can be used for strain computations. As in the cylindrical stress configuration of FIG. 3A, top surface 78 of the substrate is in tension and opposed bottom surface 80 is in compression, so that the velocity of surface skimming bulk waves propagating between transducer 82 and a transducer not shown will be altered.

FIG. 3C illustrates a pure tension configuration and comprises a piezoelectric substrate 84 attached by conventional means to mount 86. Tensile stress is applied by an external force to free end 88 of the substrate. Surface skimming bulk waves propagating in the substrate along a delay line comprising transducer 90 and a transducer not shown are sensitive to the strain in the substrate. Tension loading is the only applied stress which produces a uniform stress throughout the substrate's thickness. The stresses applied to the substrates of FIGS. 3A and 3B produce strains which vary with the depth in the beams.

In general, strain in the piezoelectric substrates can be measured by any of a variety of techniques well known in the art. The delay line in each of FIGS. 3A, 3B and 3C comprise part of an RF oscillator circuit whose resonant frequency is proportional to the strain in the substrate. The magnitude of the strain can be expressed as a change in frequency relative to the RF oscillator frequency. Strain sensitivities of different cuts of piezoelectric crystal are expressed independent of oscillator frequency in parts per million per unit microstrain (ppm/microstrain).

For sensitivities perpendicular to the direction of propagation of a surface skimming bulk wave (SSBW) propagation or transverse sensitivities, a value of +0.98 ppm/microstrain was obtained on AT cut beams. The transverse strain sensitivity does not possess a frequency dependence over oscillator frequencies ranging from 128 MHz to 638 MHz. The parallel strain sensitivity for AT cut quartz is approximately 0.1 ppm/microstrain.

The transverse strain sensitivity of BT cut quartz beams is approximately −1.95 ppm/microstrain, approximately twice as large as that of AT cut quartz. The parallel strain sensitivity of BT cut quartz beams is high with a value of +1.80. Therefore, BT cut devices show approximately twice the transverse strain sensitivity as that of AT cut quartz.

Figure 4:
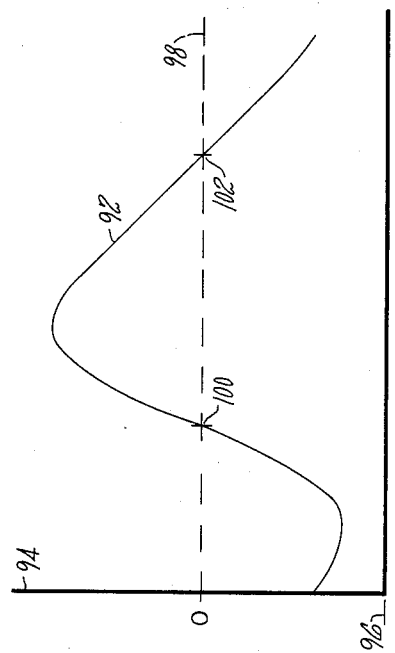
FIG. 4 is an illustration of the first order temperature coefficient of delay of selected cuts of quartz crystal used with the accelerometer of FIG. 1.

FIG. 4 is a drawing showing the calculated waveform 92 of the first order temperature coefficient of delay ($T_c$) for surface skimming bulk waves (SSBW) on a rotated Y cut quartz crystal substrate at 25° C. (curve 92). Axis 94 corresponds to the temperature coefficient of delay in parts per million per degree C and axis 96 corresponds to crystal cut rotation angle in degrees.

For strain sensor applications only the regions where curve 92 crosses the zero first order temperature coefficient line 98 are of interest. The temperature coefficient is zero in the vicinity of the AT cut (−36°) and the BT cut (+50.5°) quartz substrates. These correspond to points 100 and 102 respectively of curve 92. The second order of temperature coefficient is approximately 0.06 ppm/°C.$^2$ for the (−36°) or AT cut substrates. The BT cut (+50.5°) substrates possess a 0.03 ppm/°C.$^2$ second order temperature coefficient. Therefore, the overall temperature sensitivity of the BT cut quartz substrates are lower than that of the AT cut. A surface skimming bulk wave strain sensor provided according to the present invention on a BT cut quartz that can be regulated to within plus or minus one degree C will have an accuracy of 0.03 ppm. As is well known in the art, other quartz substrates, including doubly rotated cuts that both support surface skimming bulk waves and have a zero first order temperature coefficient can be equivalently substituted for singly rotated cuts.

Referring again to FIG. 1, in the accelerometer 10 provided according to the present invention, the piezoelectric cantilevered beam 22 comprises a 0.9 mm thick BT cut quartz crystal. In the best mode embodiment the coplanar feed transducers 28 and 30 in both the first and second major surface delay lines comprise approximately 200 wavelength long, 50 wavelength wide transducers that are separated by approximately 10 wavelengths. To form the beam a quartz substrate is fabricated with a double taper so that the opposed major surfaces aoproximately form a trapezoid to reduce the effects of reflections of surface skimming bulk waves off of the edges of the crystal. In the best mode embodiment the taper angle is approximately 5° to 10° from the longitudinal axis of the beam.

The proof mass comprises a 5 to 10 gram tungsten mass or equivalent epoxy bonded to the second minor surface. The conventional radio frequency connector feed throughs are positioned so that the electrodes lie close to the delay lines. The contact pads of the transducers of which contact pad 104 is an example are plated with copper so that the electrical connections can be made by soldering gold ribbons, such as ribbon 106, between the feed through connectors and transducers.

Not shown in FIG. 1 is a damping fluid which comprises silicone oil in the best mode embodiment. The cavity is filled with the oil, immersing the tungsten proof mass and the cantilevered beam. Because surface skimming bulk waves are horizontally polarized shear waves, they are virtually insensitive to surface contamination and the external fluid environment. In the accelerometer provided according to the present invention, the cantilevered beam is fluid damped in order to achieve both high acceleration sensitivity and acceptable vibration response characteristic near the mechanical resonant frequency.

For accelerometers having radio frequency excitation wavelengths of 24 microns and longer, the additional loss provided by the damping fluid is approximately 5.8 db or less. For wavelengths 16 microns and shorter, the losses are greater than 10 db. In the best mode embodiment the excitation wavelength is approximately 24 microns.

Acceleration induced strains in the cantilevered beam have the opposite sign in the opposing major surfaces, as described hereinbefore with respect to FIG. 3. Therefore, the sensitivity of the accelerometer can be doubled and the effects of temperature can be reduced if one surface skimming bulk wave (SSBW) delay line is formed on one major surface as part of a first RF oscillator circuit and a similar delay line is formed on the opposite surface as part of a second RF oscillator circuit as detailed hereinafter with respect fo FIG. 6.

Subtractive combination of the strain shifted signals of the two oscillator circuits will provide a low frequency output signal that is indicative of the magnitude of the acceleration. In the best mode embodiment, the error due to temperature variation is less than 0.03 ppm or 0.5 milli-g with the temperature of the beam controlled to ±1° C.

Figure 5:
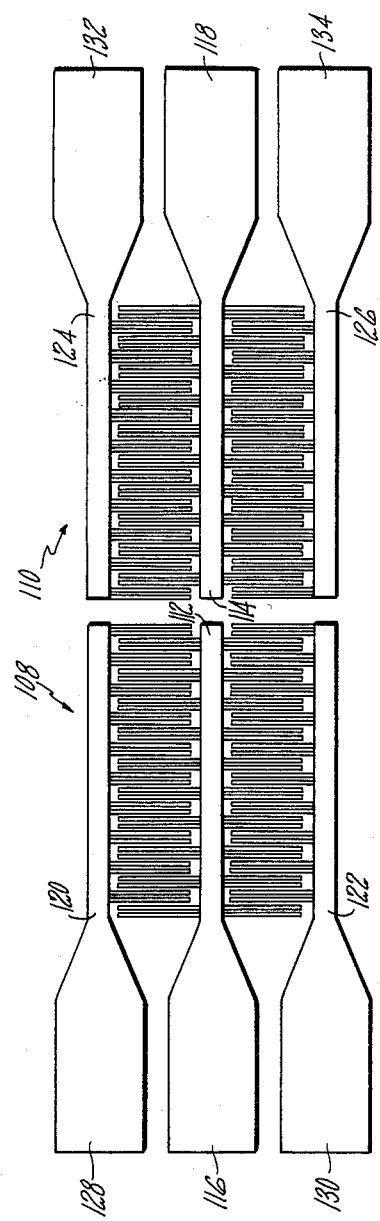
FIG. 5 is an illustration of a pair of coplanar feed transducers used in the accelerometer of FIG. 1.

FIG. 5 is a diagram of a pair of coplanar feed transducers 108 and 110 used with the accelerometer of FIG. 1. For receiving RF signals transducer 108 includes center lead 112, with transducer 110 having center lead 114 for providing RF signals to the oscillator circuit. The transducer leads each have parallel interdigitated inputs terminating in contact pads 116 and 118 respectively. For transducer 108 ground leads 120 and 122 are positioned adjacent to the center lead, as are ground leads 124 and 126 for transducer 110. The ground leads terminate in contact pads 128, 130, 132 and 134.

Those skilled in the art will note that it is not desirable to maintain the same geometry for each delay line. To prevent locking, the frequencies of the oscillator must be separated by greater than 100 KHz.

In the absence of propagation losses, the theoretical insertion loss should continue to decrease with increasing transducer length to an optimum between 200 and 220 wavelengths. However, as the length of the transducer is increased beyond about 216 wavelengths the propagation loss increases faster than the increase in acoustoelectric coupling, thereby increasing the overall insertion loss. The transducer width is then selected to achieve a capacitive reactance approximately $-j\,50$ ohms at the fundamental frequency, reducing the untuned insertion loss of propagating surface skimming bulk waves to a minimum between 29 and 31 db.

The fabrication techniques used to form both transducers on quartz or an equivalent piezoelectric substrate are well known in the art. In the best mode embodiment the transducers are fabricated on the surface of the quartz using standard photolithographic and metallization techniques. All metallization in the best mode embodiment comprises aluminum, although equivalent metals may be substituted.

Figure 6:
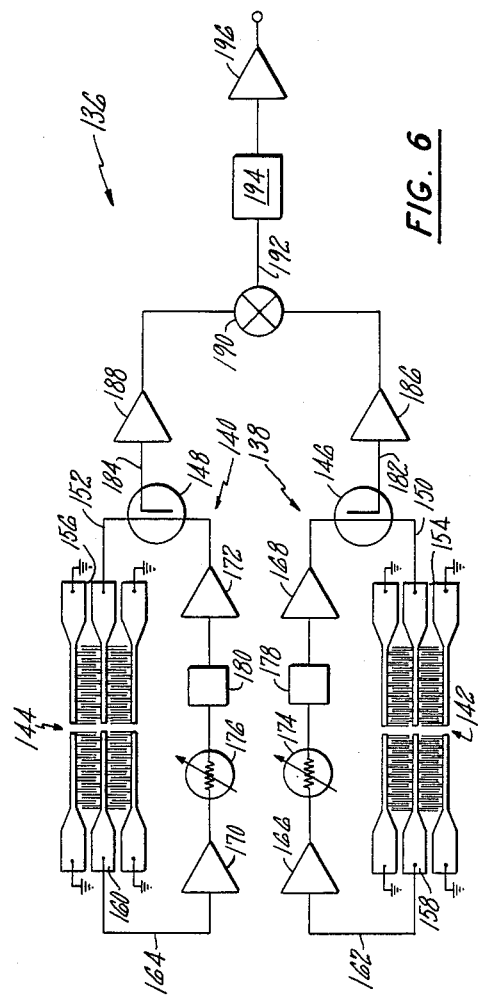
FIG. 6 is a schematic illustration of a dual oscillator electrical circuit used with the accelerometer of FIG. 1.

FIG. 6 is a schematic representation of a dual oscillator electrical circuit 136 used with the accelerometer of FIG. 1. In the best mode embodiment the dual oscillator electrical circuit comprises two radio frequency (RF) oscillator circuits 138 and 140 each having a series connected surface skimming bulk wave delay line 142 and 144 of the type detailed hereinabove with respect to FIG. 5 and fabricated on the beams' opposed major surfaces.

Other conventional components included in the RF oscillator circuits are 10 db couplers 146 and 148 such as a Merrimac Model C-114 which provides signals on lines 150 and 152 to input transducers 154 and 156. Output transducers 158 and 160 provide feedback signals on lines 162 and 164 respectively to cascaded pairs of Avantek UTO-512 RF amplifiers 166, 168 and 170, 172 which provide sufficient gain to overcome insertion loss of the surface skimming bulk wave delay lines and allow for proper frequency tuning. Excess gain is controlled by voltage controlled attenuators 174 and 176. Oscillator circuit phase adjustments are accomplished by conventional means such as a T section LC phase shifters 178 and 180.

Each coupler provides output signals from its RF oscillator circuit on lines 182 and 184 to conventional buffer amplifiers 186 and 188 to provide any buffering needed to minimize the effect of external circuit perturbations. Mixer 190, typically a Merrimac M-109 receives output signals from the buffer amplifiers and provides signals on lines 192 that are a subtractive combination of signals input thereto. Low pass filter 194 and amplifier 196 output low frequency signals whose frequency magnitude is the difference frequency between signals of RF oscillator circuits 138 and 140 indicative of magnitude of the acceleration induced strain within the beam.

Similarly, although the invention has been shown and described with respect to a best mode embodiment thereof, it should be understood by those skilled in the art that various other changes, omission and additions thereto may be made therein without departing from the spirit and scope of the invention.

I claim:

1. A surface skimming bulk wave (SSBW) accelerometer, for use in a system having one or more oscillator circuits with an output for providing output radio frequency (RF) excitation signals, and an input for receiving input RF excitation signals, comprising:
    chassis means, having a fluid filled cavity with a mounting surface therein;
    piezoelectric cantilever, fixed at one end to said mounting surface and having a proof mass at an opposite end thereof, said cantilever having first and second major surfaces, wherein acceleration of said proof mass induces a strain in said major surface, said strain being proportional to said acceleration;

coplanar feed transducers, including an input transducer and an output transducer disposed in spaced relationship on said first major surface to provide a SSBW delay line, said input transducer converting output RF signals from an oscillator circuit output to a launched SSBW for propagation in said first major surface of said cantilever, said output transducer converting said launched SSBW in said first major surface to first surface input RF signals for presentation to the oscillator circuit input, said first surface input RF signals being delayed from the output RF signals by a time dependent on said strain induced in said first major surface, whereby the oscillator circuit provides the first surface input RF signals at a first surface signal frequency indicative of said strain and said acceleration.

2. The surface skimming bulk wave accelerometer of claim 1, further comprising:

second coplanar feed transducers, including a second input transducer and a second output transducer disposed in spaced relationship on said second major surface to form a second SSBW delay line, said second input transducer converting output RF signals from a second oscillator circuit of the system to a launched SSBW for propagation in said second major surface of said cantilever, said second output transducer converting said launched SSBW in said second major surface to second surface input RF signals for presentation to the second oscillator circuit input, said second surface input RF signals being delayed from the output RF signals at said second input transducer by a time dependent on said strain induced in said second major surface, the second oscillator circuit providing the second surface input RF signals at a second surface signal frequency indicative of said strain in said second major surface, whereby the difference signal frequency between said first surface signal frequency and said second surface signal frequency is indicative of said acceleration.

3. The surface skimming bulk wave accelerometer of claim 1, wherein said chassis means comprises copper.

4. The surface skimming bulk wave accelerometer of claim 1, wherein said chassis means comprises aluminum.

5. The surface skimming bulk wave accelerometer of claim 1, wherein said cantilever comprises BT cut quartz.

6. The surface skimming bulk wave accelerometer of claim 1, wherein said cantilever comprises AT cut quartz.

7. The surface skimming bulk wave accelerometer of claim 1, wherein said cantilever comprises a silicon dioxide ($SiO_2$) coated lithium niobate.

* * * * *